US007742381B2

(12) United States Patent  (10) Patent No.: US 7,742,381 B2
Hendriks et al.  (45) Date of Patent: Jun. 22, 2010

(54) OPTICAL SCANNING DEVICE

(75) Inventors: Bernardus Hendrikus Wilhelmus Hendriks, Eindhoven (NL); Joris Jan Vrehen, Eindhoven (NL); Pascal Jean Henri Bloemen, Eindhoven (NL); Peter Coops, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1153 days.

(21) Appl. No.: 10/569,038

(22) PCT Filed: Aug. 20, 2004

(86) PCT No.: PCT/IB2004/002731

§ 371 (c)(1),
(2), (4) Date: Feb. 21, 2006

(87) PCT Pub. No.: WO2005/020219

PCT Pub. Date: Mar. 3, 2005

(65) Prior Publication Data

US 2006/0203302 A1 Sep. 14, 2006

(30) Foreign Application Priority Data

Aug. 26, 2003 (EP) ................................. 03300095

(51) Int. Cl.
*G11B 7/00* (2006.01)
(52) U.S. Cl. .............................. 369/112.01; 369/112.23; 369/44.23; 369/44.25
(58) Field of Classification Search ........................ None
See application file for complete search history.

(56) References Cited

U.S. PATENT DOCUMENTS

| 6,229,600 | B1 | 5/2001 | Martynov |
| 6,538,978 | B1 | 3/2003 | Holtslag et al. |
| 2001/0002186 | A1 | 5/2001 | Maruyama |
| 2002/0003755 | A1 | 1/2002 | Fujita et al. |
| 2002/0012313 | A1* | 1/2002 | Kimura et al. ......... 369/112.08 |
| 2002/0036958 | A1 | 3/2002 | Wada et al. |
| 2002/0067666 | A1 | 6/2002 | Maeda et al. |
| 2003/0108813 | A1 | 6/2003 | Watabe et al. |
| 2004/0095860 | A1 | 5/2004 | Ariyoshi et al. |

FOREIGN PATENT DOCUMENTS

| EP | 1329881 A2 | 7/2003 |
| WO | 0109885 A1 | 2/2001 |
| WO | 03050801 A2 | 6/2003 |

OTHER PUBLICATIONS

M. Born, et al: Principles of Optics, 6th edition, 1993, pp. 166-169.
ISR Publication, International Publication No. WO2005/020219A3.

* cited by examiner

*Primary Examiner*—Muhammad N. Edun

(57) ABSTRACT

The invention relates to an optical scanning device for scanning in a first mode a first information layer (111) of an information carrier and in a second mode a second information layer (112) of the information carrier. The optical scanning device comprises a radiation source (101) for generating a radiation beam (102), an objective system (105) for focusing an entrance beam on an information layer and an optical element (103) arranged between the radiation source and the objective system, for converting said radiation beam into a diverging entrance beam in the first mode and a converging entrance beam in the second mode.

6 Claims, 5 Drawing Sheets

OPTICAL SCANNING DEVICE

FIELD OF THE INVENTION

The present invention relates to an optical scanning device for scanning a multi-layer information carrier.

The present invention is particularly relevant for an optical disc apparatus for reading and/or recording data from and/or to an optical disc, e.g. a Blu-Ray Disc (BD) player and/or recorder.

BACKGROUND OF THE INVENTION

Information carriers having a plurality of information layers are widely used. For example, some DVDs (DVD stands for Digital Versatile Disc) comprise a first and a second information layers, which can be scanned by means of a radiation beam, in order to read from or record to one of these information layers. The expression "scanning" means either reading or writing data from or to an information layer.

An optical scanning device for scanning such a dual-layers DVD comprises a radiation source for generating a diverging radiation beam, a collimator for converting this diverging beam into a parallel beam and an objective lens for focussing said parallel beam on one of the two information layers. The optical scanning device comprises an actuator for moving the objective lens axially in order to focus the parallel beam on the desired information layer.

When the objective lens is moved in order to jump from the first information layer to the second information layer, a certain amount of spherical aberration occurs. However, in the case of a DVD, this amount of spherical aberration is relatively low, because the numerical aperture of the radiation beam is relatively low and the wavelength relatively high. The amount of spherical aberration is indeed within the tolerances of the optical scanning device, so that no spherical aberration correction is needed. Hence, when jumping from one information layer to another, only a refocusing action is required.

Now, in order to increase the capacity of an information layer, a next generation optical disc system has been designed, which uses a higher numerical aperture and a lower wavelength of the radiation beam. For example, a BD player and/or recorder uses an objective lens with a numerical aperture of 0.85 and a radiation beam with a wavelength of 405 nanometers. As a consequence, the amount of spherical aberration that occurs when jumping from one layer to another is higher than for a DVD player. Actually, the amount of spherical aberration is proportional to the fourth power of the numerical aperture, which means that a slight increase in the numerical aperture leads to a large increase in the amount of spherical aberration. Typically, for a dual-layer BD, the amount of spherical aberration that occurs when jumping from one layer to another is about 250 ml rms, which is out of the tolerances of the optical scanning device. As a consequence, it is necessary to correct for the spherical aberration when jumping from one layer to another.

A way of correcting for the spherical aberration when jumping from the first information layer to the second information layer consists in designing the objective lens so that no spherical aberration occurs when a parallel entrance beam is focussed on the first information layer, i.e. when an infinite conjugate is used. When jumping to the second information layer, the vergence of the entrance beam is changed, i.e. a finite conjugate is used. For example, a converging entrance beam is focussed on said second information layer. The objective lens is designed to significantly comply with the sine condition in order to have a substantial field of view. A lens designed to comply with the sine condition is known to give rise to spherical aberration when the conjugate distance compared to the design situation is changed. This is explained, for example, in "Principles of Optics", by M. Born and E. Wolf, Pergamon Press, Oxford, 1993, p166-169. As a consequence, by changing the conjugate distance, i.e. the vergence of the entrance beam, it is possible to generate spherical aberration, which compensates the spherical aberration that occurs when jumping from one layer to another.

However, due to eccentricity of the spirals of the information carrier, the objective lens has to be moved away from its central position during scanning, that is to say a decentring of the objective lens occurs during scanning. Now, when a finite conjugate is used for scanning the second information layer, the objective lens is sensitive for decentring. The higher the vergence of the entrance beam, the more sensitive for decentring the objective lens. As a consequence, the possible decentring of the objective lens of an optical scanning device as described above is limited, and such an optical scanning device cannot scan an information carrier presenting a relatively high eccentricity of the spirals.

SUMMARY OF THE INVENTION

It is an object of the invention to provide an optical scanning device which is less sensitive for decentring of the objective lens.

To this end, the invention proposes an optical scanning device for scanning in a first mode a first information layer of an information carrier and in a second mode a second information layer of said information carrier, said optical scanning device comprising a radiation source for generating a radiation beam, an objective system for focussing an entrance beam on an information layer and an optical element arranged between the radiation source and the objective system, for converting said radiation beam into a diverging entrance beam in the first mode and a converging entrance beam in the second mode.

According to the invention, a finite conjugate is used for scanning the first and the second information layers. This means that the objective lens is designed for focussing without spherical aberration a parallel entrance beam on a certain plane located between the first and second information layers. A diverging entrance beam is thus used for compensating the spherical aberration that occurs during scanning of the first information layer, and a converging entrance beam is used for compensating the spherical aberration that occurs during scanning of the second information layer. As the amount of spherical aberration that occurs when jumping from the first to the second information layer is the same as in the prior art, the vergences of the diverging and the converging entrance beams are reduced compared to the vergence of the converging beam used in the prior art for scanning the second information layer. This is because a part of this spherical aberration is compensated when scanning the first information layer, and another part when scanning the second information layer, whereas all the spherical aberration is compensated when scanning the second information layer in an optical scanning device of the prior art.

The optical scanning device in accordance with the invention is sensitive for decentring when scanning the first and the second information layers. However, it is less sensitive than the optical scanning device of the prior art, because the vergences of the diverging and the converging beam are reduced.

In a preferred embodiment, the objective system is designed for focussing without spherical aberration a parallel entrance beam on a plane substantially equidistant between the first and the second information layers. According to this preferred embodiment, a same part of the spherical aberration that occurs when jumping from the first to the second information layer is compensated during scanning of the first information layer as during scanning of the second information layer. As a consequence, the vergences of the converging and diverging beams are substantially equal, and the tolerance for decentring during scanning of the first information layer is substantially equal to the tolerance for decentring during scanning of the second information layer. This allows obtaining a relatively high tolerance for decentring during scanning of the two information layers.

In an advantageous embodiment, the optical element is a collimator. The collimator that is used in conventional optical scanning devices is used for converting the radiation beam into a converging or a diverging entrance beam. As a consequence, a conventional optical scanning device can be used for implementing the invention, which is suitably programmed for moving the collimator in accordance with a mode of operation.

In another preferred embodiment, the optical scanning device is further adapted for scanning in a third mode a third information layer of said information carrier, located between the first and the second information layers, the optical element being adapted for converting the radiation beam into a parallel entrance beam in said third mode. Such an optical scanning device is well adapted for scanning an information carrier comprising an odd number of information layers.

In another advantageous embodiment, the optical scanning device comprises means for providing a measure of a spherical aberration and means for controlling the optical element depending on said measure. This provides a finer compensation of the spherical aberration.

These and other aspects of the invention will be apparent from and will be elucidated with reference to the embodiments described hereinafter.

BRIEF DESCRIPTION OF THE DRAWINGS

The invention will now be described in more detail, by way of example, with reference to the accompanying drawings, in which.

DETAILED DESCRIPTION OF THE INVENTION

Figure 1:
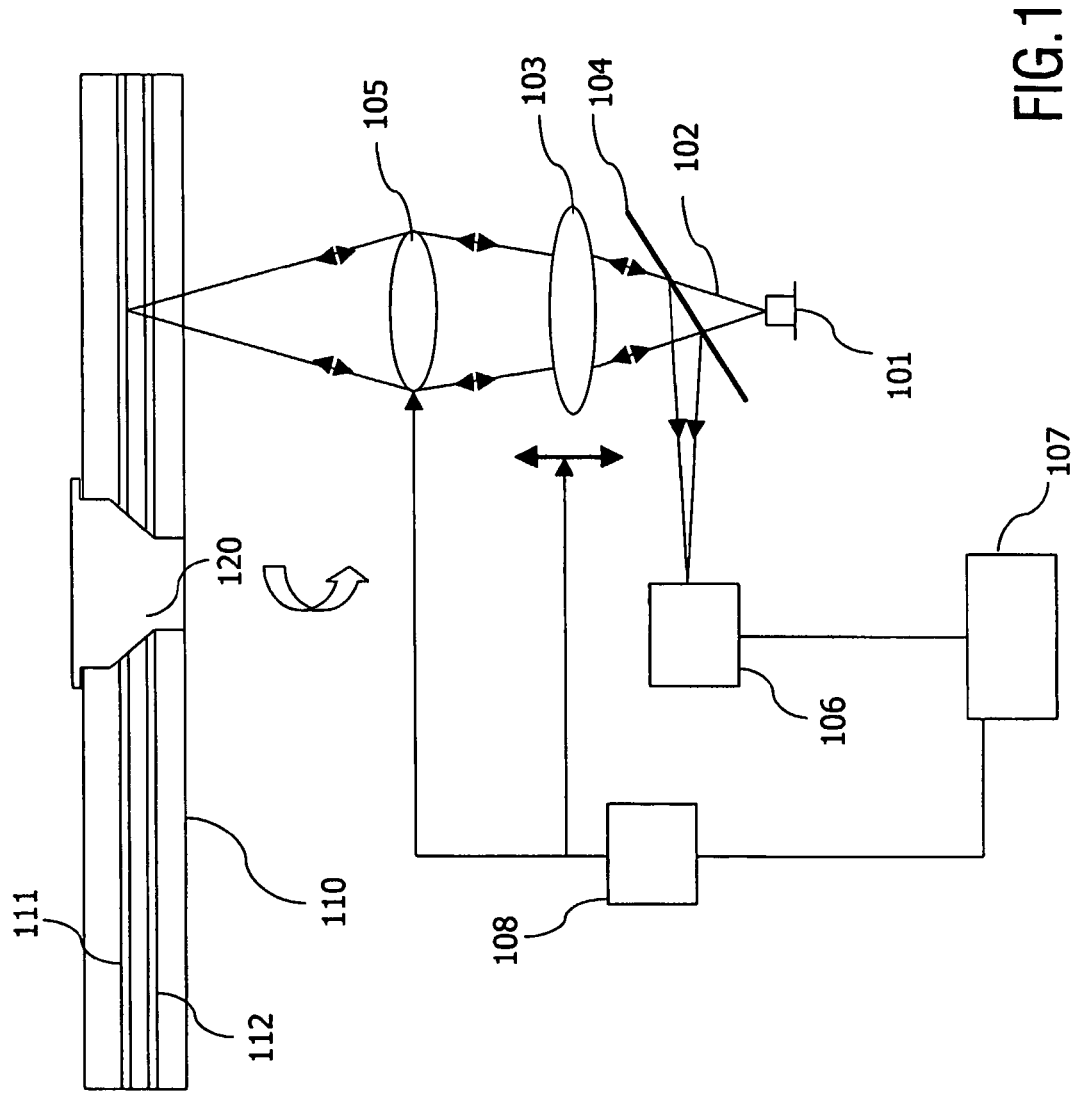
FIG. 1 shows an optical scanning device in accordance with the invention, in a first mode.
Figure 2:
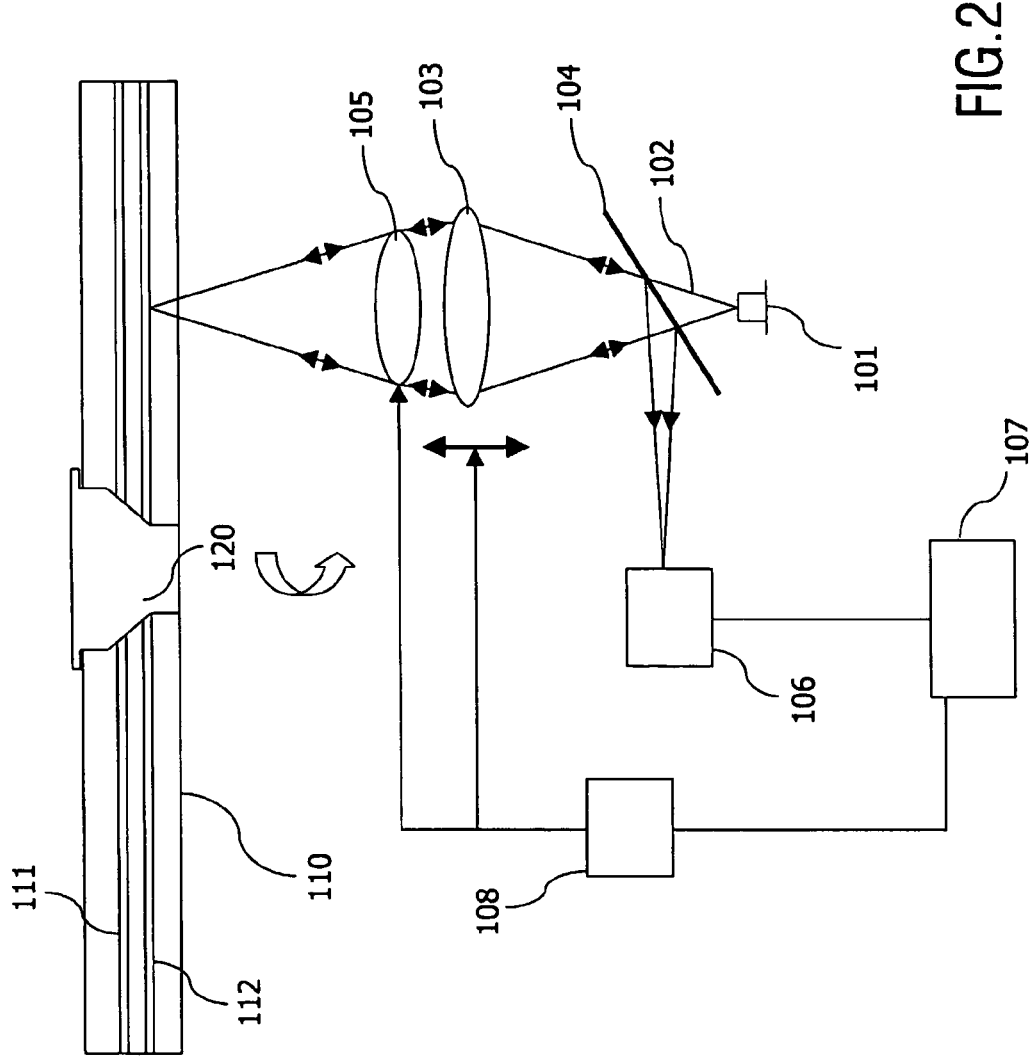
FIG. 2 shows the optical scanning device of FIG. 1, in a second mode.

An optical scanning device in accordance with the invention is depicted in FIGS. 1 and 2. Such an optical scanning device comprises a radiation source 101 for producing a radiation beam 102, a collimator 103, a beam splitter 104, a servo controlled objective lens 105, detecting means 106, measuring means 107 and a controller 108. This optical scanning device is intended for scanning an information carrier 110. The information carrier 110 comprises a first information layer 111 and a second information layer 112. The optical scanning device further comprises a turntable 120 for receiving the information carrier 110.

During a scanning operation, which can be a writing operation or a reading operation, the radiation beam 102 is transformed by the collimator 103 and the objective lens 105, as will be described in details hereinafter. A resulting beam is obtained, and the information carrier 110 is scanned by the resulting beam. A focus error signal is detected, the magnitude of which corresponds to an error of positioning of the resulting beam on the information layer. This focus error signal might be used in order to correct the axial position of the objective lens 105. A signal is sent to the controller 108, which drives an actuator in order to move the objective lens 105 axially.

The focus error signal and the data written on the information layer are detected by the detecting means 106. The radiation beam reflected by the information carrier 110 reaches the detecting means 106 by means of the beam splitter 104.

It should be noticed that in another embodiment, the signal corresponding to information written in the information carrier 110 can be detected in transmission by a second objective lens and second detecting means, which are placed opposed to the objective lens 105, compared to the information carrier 110.

It should also be noticed that in another embodiment, the information carrier 110 can have a mirror at the back of the whole carrier, that reflects the beam transmitted through the first and second information layers 111 and 112. In this case, the optical scanning device as shown in FIG. 1 and 2 can be used to read the data.

The optical scanning device in accordance with the invention is represented in FIG. 1 in the first mode and in FIG. 2 in the second mode. The collimator 103 is an optical element placed between the radiation source 101 and the objective lens 105. In the first mode, the collimator 103 converts the radiation beam 102 into a diverging entrance beam, which reaches the objective lens 105. In the second mode, the collimator 103 converts the radiation beam 102 into a converging entrance beam. When the collimator is in a position such that the radiation source 101 is at its focal point, the collimator 103 converts the radiation beam 102 into a parallel entrance beam. In order to obtain a diverging entrance beam, the collimator 103 is moved towards the radiation source 102, compared to said position. In order to obtain a converging entrance beam, the collimator 103 is moved away from the radiation source 102, compared to said position. The position of the collimator 103 is controlled by an actuator, which is controlled by the controller 108. The controller 108 is a multi-purpose controller that can control independently the actuator for moving the objective lens 105 and the actuator for moving the collimator 103. Depending on the scanning mode, the controller 108 controls the position of the collimator 103. In other words, when the first information layer is scanned, the collimator 103 is placed in the position represented in FIG. 1 and when the second information layer is scanned, the collimator 103 is placed in the position represented in FIG. 2.

The objective lens 105 is designed in such a way that, when it focuses a parallel entrance beam on a certain plane located between the first and second information layers of the information carrier 110, no spherical aberration occurs. As a consequence, if the first information layer 111 were scanned with a parallel entrance beam, spherical aberration would occur. By changing the conjugate distance during scanning of the first information layer 111, i.e. employing a diverging entrance beam, the objective lens 105 gives rise to spherical aberration, which compensates the abovementioned spherical aberration. The position of the collimator 103 is determined in such a way that no spherical aberration occurs when the diverging entrance beam is focussed on the first information layer 111. Preferably, the optical scanning device comprises means for measuring the spherical aberration and means for controlling the position of the collimator 103, depending on the measured spherical aberration. The measure of the spherical aberration during scanning of the first information layer 111 is sent to the controller 108, which controls the position of the collimator 103, in order to suppress the spherical aberration. The spherical aberration is measured according to conventional means, such as described in U.S. Pat. No. 6,229,600 for example.

The second information layer 112 is scanned with a converging entrance beam, in order to compensate the spherical aberration that would occur if the second information layer were scanned with a parallel entrance beam. As explained for the first information layer 111, the position of the collimator 103 is preferably controlled by the controller 108, depending on a measure of the spherical aberration.

The optical scanning device in accordance with the invention is sensitive for decentring when scanning the first and the second information layers. Actually, in the first and second modes, a finite conjugate is used. However, it is less sensitive than in the prior art, where the first information layer 111 is scanned with a parallel entrance beam and the second information layer 112 is scanned with a converging entrance beam. Actually, the vergence of the converging beam in the optical scanning device in accordance with the invention is lower than the vergence of the converging beam in the optical scanning device of the prior art. This is because the amount of spherical aberration that has to be compensated when jumping from the plane where a parallel entrance beam is focussed without spherical aberration to the second information layer 112 is lower in the optical scanning device in accordance with the invention than in the optical scanning device of the prior art.

In order to significantly reduce the sensitivity for decentring compared to the prior art, the plane where a parallel entrance beam is focussed without spherical aberration has to be sufficiently away from the first and second information layers 111 and 112. Actually, if this plane is too close to one of these information layers, the sensitivity for decentring is reduced, but not significantly. Preferably, if the distance between the first and the second information layers 111 and 112 is D, this plane is at least 0.2 D away from each of the layers 111 and 112. More preferably, this plane is 0.5 D away from the first and the second information layers 111 and 112, which means that the objective system is designed for focussing without spherical aberration a parallel entrance beam on a plane substantially equidistant between the first and the second information layers. In this case, it can easily be shown that the decentring tolerance is increased by a factor of two, compared to the prior art.

Moreover, it should be noted that in fact, a few amount of spherical aberration remains during scanning of the first and second information layers 111 and 112. This also occurs in the prior art, but only during scanning of the second information layer. Actually, only the so-called third order spherical aberration is compensated when the conjugate distance compared to the design situation is changed, but a certain amount of higher order spherical aberration remains. According to the invention, the higher order spherical aberration is distributed over the first and second information layers 111 and 112, because the total amount of higher order spherical aberration is the same in the optical scanning device in accordance with the invention as in an optical scanning device of the prior art. For example, if the objective lens 105 is designed for focussing without spherical aberration a parallel entrance beam on a plane substantially equidistant between the first and the second information layers 111 and 112, the higher order spherical aberration is evenly distributed over the first and second information layers 111 and 112.

This is advantageous, especially in the case where the higher order spherical aberration is relatively high and perturbs scanning of the second information layer in an optical scanning device of the prior art, because it is out of the tolerances of said optical scanning device. According to the invention, the higher order spherical aberration is reduced when scanning the second information layer 112, so that it might be within the tolerances of the optical scanning device.

Figure 3:
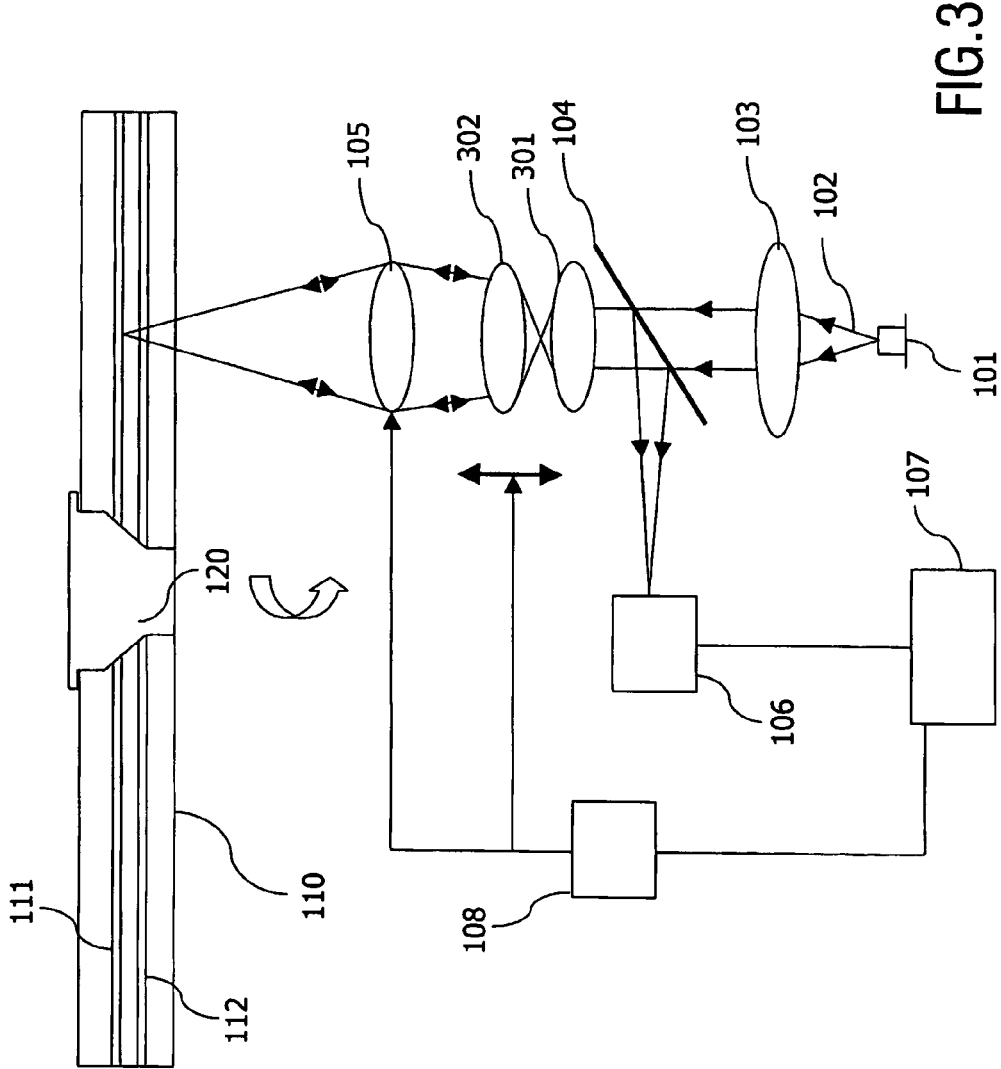
FIG. 3 shows another optical scanning device in accordance with the invention, in a first mode.

Another optical scanning device in accordance with the invention is depicted in FIG. 3. Such an optical device comprises, in addition to the elements described in FIGS. 1 and 2, a beam expander which comprises a first expander lens 301 and a second expander lens 302.

In this other optical scanning device, the collimator 103 is placed in such a way that the radiation source 101 is at its focal point. The collimator 103 thus converts the radiation beam 102 into a parallel beam. Then, the beam expander converts said parallel beam into a converging or a diverging beam, depending on the mode. In the example of FIG. 3, the optical scanning device is represented in the first mode, thus the beam expander converts said parallel beam into a diverging beam. The collimator 103, the first lens 301 and the second lens 302 form an optical element placed between the radiation source 101 and the objective lens 105, which converts the radiation beam 102 into a diverging entrance beam in the first mode and a converging entrance beam in the second mode.

Such a beam expander is well known for those skilled in the art. For example, the patent application US 2002/0067666, published Jun. 6, 2002, describes such a beam expander. The second expander lens 302 is moved by means of an actuator, which is controlled by the controller 108. Depending on the mode, the controller 108 controls the position of the second expander lens 302, so that a diverging or a converging entrance beam is generated.

Figure 4C:
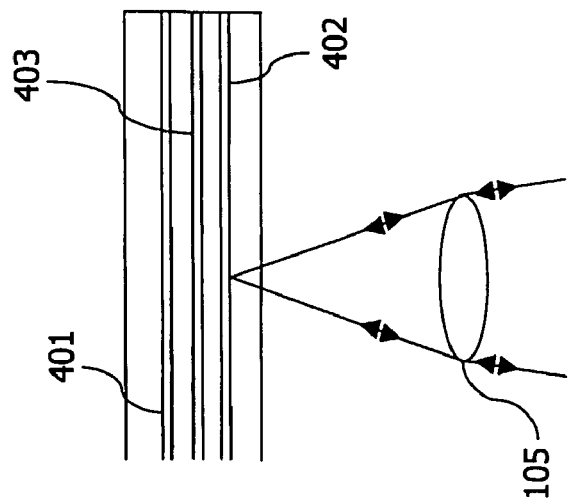
FIG. 4a to 4c show an objective system for scanning an information carrier comprising three information layers.
Figure 4B:
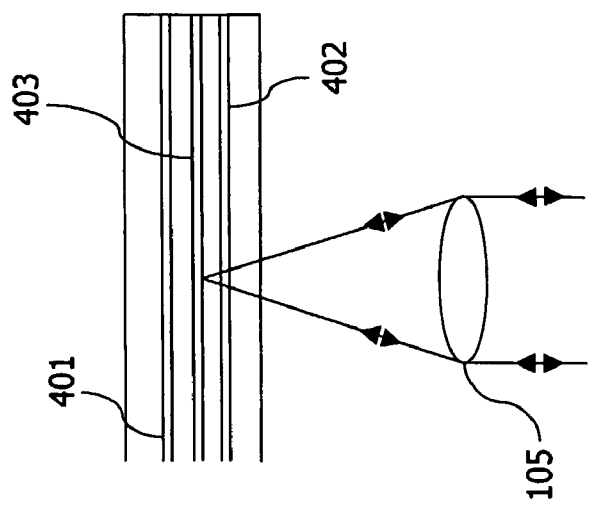
Figure 4A:
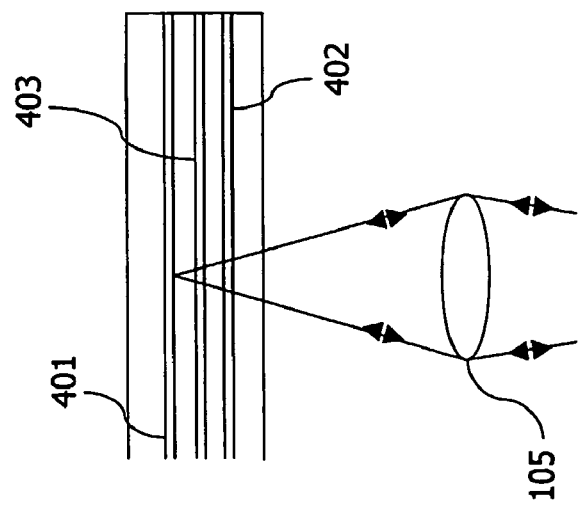
Figure 5D:
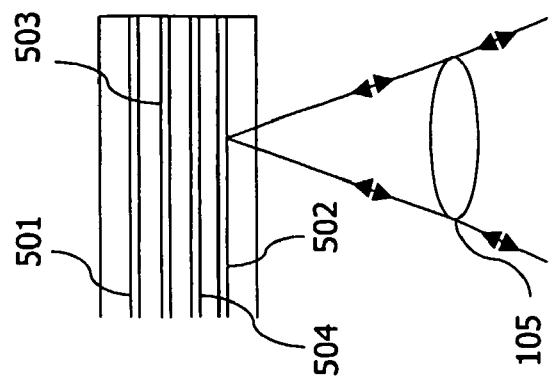
FIG. 5a to 5d show an objective system for scanning an information carrier comprising four information layers.
Figure 5C:
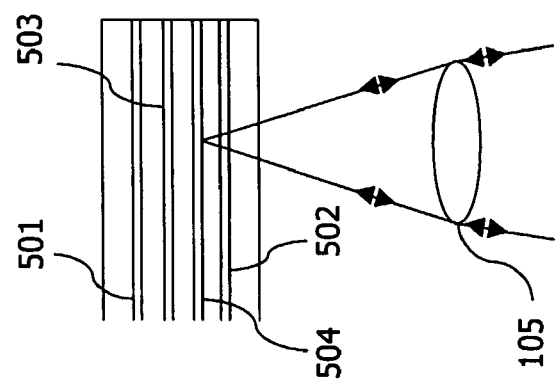
Figure 5B:
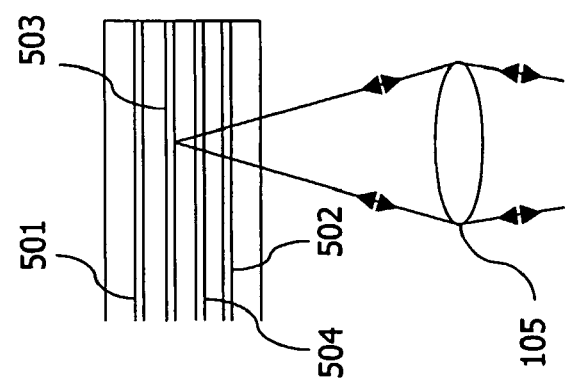
Figure 5A:
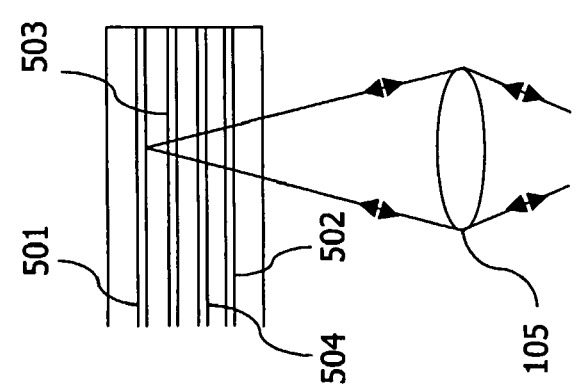

FIG. 4a to 4c show an objective system for scanning an information carrier comprising three information layers. In FIG. 4a to 4c, only the objective system, which is the objective lens 105, has been represented. The diverging, parallel and converging entrance beam represented on FIG. 4a to 4c, respectively, are generated by means of an optical element, as described in FIG. 1, 2 or 3. The information carrier comprises a first information layer 401, a second information layer 402 and a third information layer 403.

The first information layer 401 is scanned by means of a diverging entrance beam, as described in FIG. 1. The second information layer 402 is scanned by means of a converging entrance beam, as described in FIG. 2. The third information layer, which is between the first and second information layers 401 and 402, is scanned by means of a parallel entrance beam. This means that the objective lens 105 is designed for focussing without spherical aberration a parallel entrance beam on the third information layer 403. Hence, no spherical aberration occurs during scanning of the third information layer 403, and the optical scanning device is insensitive for decentring during scanning of the third information layer 403.

In the example of FIG. 4a to 4c, the third information layer 403 is substantially equidistant between the first and second information layers 401 and 402. Hence, as described in FIGS. 1 and 2, the sensitivity for decentring is evenly distributed over the first and second information layers 401 and 402, as well as the higher order spherical aberration, which is particularly advantageous.

FIG. 5a to 5d show an objective system for scanning an information carrier comprising four information layers. The information carrier comprises a first information layer 501, a second information layer 502, a third information layer 503 and a fourth information layer 504. The first information layer 501 is scanned by means of a converging entrance beam having a first vergence. The third information layer 503 is scanned by means of a converging entrance beam having a second vergence, which is lower than the first vergence. The fourth information layer 504 is scanned by means of a diverging entrance beam having a third vergence. The second information layer 502 is scanned by means of a diverging entrance beam having a fourth vergence, which is greater than the third vergence.

In this case, the objective lens 105 is designed for focussing without spherical aberration a parallel entrance beam on a plane located between the third information layer 503 and the fourth information layer 504, preferably equidistant between the third and fourth information layers 503 and 504.

It should be noticed that the optical scanning device in accordance with the invention can be used for scanning information carriers having different numbers of information layers. For an information carrier having 2X information layers, X being an integer, X converging entrance beams and X diverging entrance beams are preferably used. For an information carrier having 2X+1 information layers, X converging entrance beams, X diverging entrance beams and one parallel entrance beam are preferably used. This allows distributing the sensitivity for decentring over the information layers in an effective way.

Any reference sign in the following claims should not be construed as limiting the claim. It will be obvious that the use of the verb "to comprise" and its conjugations does not exclude the presence of any other elements besides those defined in any claim. The word "a" or "an" preceding an element does not exclude the presence of a plurality of such elements.

The invention claimed is:

1. An optical scanning device for scanning in a first mode a first information layer (111) of an information carrier and in a second mode a second information layer (112) of said information carrier, said optical scanning device comprising:
    a radiation source (101) for generating a radiation beam (102),
    an objective system (105) for focusing an entrance beam on a plane between the first and second information layers, and
    an optical element (103) arranged between the radiation source and the objective system, for converting said radiation beam into a diverging entrance beam in the first mode and a converging entrance beam in the second mode.

2. An optical scanning device as claimed in claim 1, wherein the plane is substantially equidistant between the first and the second information layers.

3. An optical scanning device as claimed in claim 1, wherein said optical element is a collimator.

4. An optical scanning device as claimed in claim 1, wherein said optical element comprises a beam expander (301-302).

5. An optical scanning device as claimed in claim 1, said optical scanning device being further adapted for scanning in a third mode a third information layer (403) of said information carrier, located between the first and the second information layers (401,402), the optical element being adapted for converting the radiation beam into a parallel entrance beam in said third mode.

6. An optical scanning device as claimed in claim 1, further comprising:
    means for providing a measure of a spherical aberration and means for controlling the optical element depending on said measure.

* * * * *